United States Patent Office 3,767,665
Patented Oct. 23, 1973

3,767,665
ISOXAZOLINONE COMPOUNDS, PROCESS FOR THE PREPARATION THEREOF AND THEIR USE AS AGRICULTURAL CHEMICALS
Kazuo Tomita, Tokyo, and Yukiyoshi Takahi, Shiga-ken, Yasu-machi, Japan, assignors to Sankyo Company Limited, Tokyo, Japan
No Drawing. Filed Nov. 19, 1971, Ser. No. 200,501
Claims priority, application Japan, Nov. 27, 1970, 45/104,677
Int. Cl. C07d 85/18
U.S. Cl. 260—307 A                10 Claims

ABSTRACT OF THE DISCLOSURE

Isoxazolinone compounds have the formula

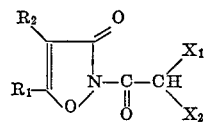

wherein $R_1$ represents a lower alkyl group or phenyl group, $R_2$ represents hydrogen atom, a halogen atom or a lower alkyl group, $X_1$ represents a halogen atom and $X_2$ represents hydrogen atom or a halogen atom. These compounds are useful as an agricultural bactericidal and fungicidal agent and prepared by reacting the 3-hydroxy-isoxazole derivative having the formula

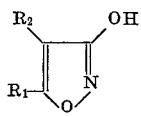

wherein $R_1$ and $R_2$ are as defined above with the acid halide having the formula

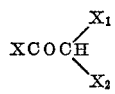

wherein $X_1$ and $X_2$ are as defined above and X represents a halogen atom.

---

This invention relates to a new group of isoxazolinone compounds, a process for the preparation thereof and their use as agricultural chemicals.

More particularly, this invention is concerned with an isoxazolinone compound having the formula

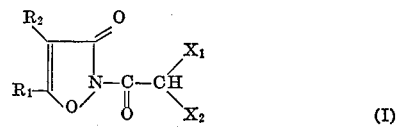

wherein $R_1$ represents a lower alkyl group or phenyl group, $R_2$ represents hydrogen atom, a halogen atom or a lower alkyl group, $X_1$ represents a halogen atom and $X_2$ represents hydrogen atom or a halogen atom and with a process for the preparation of the isoxazolinone Compounds I as well as with an agricultural bactericidal and fungicidal composition which comprises as an active ingredient the isoxazolinone Compound I and an agriculturally-acceptable carrier.

In the definitions of the above Formula I, the lower alkyl group may be those of 1 to 5 carbon atoms, preferably of 1 to 3 carbon atoms, e.g., methyl, ethyl, propyl, butyl or pentyl; and the halogen atom may be chlorine, bromine, iodine or fluorine, preferably chlorine or bromine.

Heretofore were found a wide variety of microbial plant diseases and many useful plants or crops are frequently and badly damaged by such diseases. Particularly, with respect to such useful plants as rice plants, tomatoes, cucumbers and citrus trees, there have been known such injurious microbial diseases as bacterial leaf blight caused by *Xanthomonas oryzae*, bacterial wilt caused by Pseudomonas solanacearum, canker caused by *Xanthomonas citri*, bacterial canker caused by *Corynebacterium michiganense*, rice blast caused by *Pyricularia oryzae*, damping-off caused by *Fusarium oxysporum*, powdery mildew caused by *Schaerotheca fuliginea* and the like.

Various attempts to develop valuable agricultural chemicals for combatting these microbial diseases have been made in the art. However, such previous attempts have not practically succeeded in obtaining satisfactory results.

As a result of our extensive studies on bactericidal and fungicidal activities of isoxazole derivatives, we have found that a specific group of the isoxazolinone Compounds I exert potent bactericidal and fungicidal activities against various bacterial and other microbial diseases, including soil-borne diseases, such as those diseases as depicted hereinabove, especially bacterial leaf blight of rice plants, in pre- or post-emergency treatment.

It is, accordingly, a primary object of this invention to provide a novel and useful class of the isoxazolinone Compounds I.

Another object is to provide a process for the preparation of the isoxazolinone Compounds I.

Still another object is to provide an agricultural bactericidal and fungicidal composition which contains as an active ingredient an effective amount of the isoxazolinone Compounds I.

Other objects and advantages of this invention will be apparent from the detailed description of this invention as follows.

In one aspect of this invention, the isoxazolinone Compounds I are all new substances and useful as agricultural chemicals for controlling such microbial diseases as set forth above.

Of the isoxazolinone Compounds I, are preferable the isoxazolinone compounds having the following Formula II

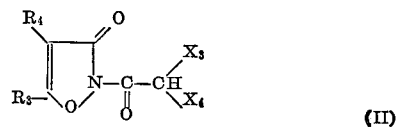

wherein $R_3$ represents an alkyl group of 1 to 3 carbon atoms or phenyl group, $R_4$ represents hydrogen atom, bromine atom or chlorine atom or an alkyl group of 1 to 3 carbon atoms, $X_3$ represents bromine atom or chlorine atom and $X_4$ represents hydrogen atom, bromine atom or chlorine atom.

More specifically, the isoxazolinone compounds having the following Formula III are most preferable in view of their bactericidal and fungicidal activities:

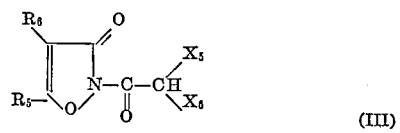

wherein $R_5$ represents methyl group or phenyl group, $R_6$ represents hydrogen atom, chlorine atom or methyl group, $X_5$ represents bromine atom or chlorine atom and $X_6$ represents hydrogen atom or chlorine atom.

Representative of the preferable group of the isoxazolinone compounds having the above Formula I are as follows:

| Compound No. | Chemical name | Physical property |
|---|---|---|
| 1 | 2-bromoacetyl-5-methyl-3-isoxazolinone. | M.P. 105–106° C. |
| 2 | 2-dichloroacetyl-5-methyl-3-isoxazolinone. | M.P. 105–106° C. |
| 3 | 2-bromoacetyl-4,5-dimethyl-3-isoxazolinone. | B.P. 130–135° C./0.02 mm. Hg. |
| 4 | 2-chloroacetyl-5-methyl-3-isoxazolinone. | M.P. 91–94° C. |
| 5 | 2-chloroacetyl-5-phenyl-3-isoxazolinone. | M.P. 138–142° C. |
| 6 | 2-chloroacetyl-4-chloro-5-phenyl-3-isoxazolinone. | M.P. 120–124.5° C. |
| 7 | 2-chloroacetyl-4-chloro-5-methyl-3-isoxazolinone. | M.P. 63–65° C. |

In another aspect of this invention, the isoxazolinone Compounds I can be prepared by a process which comprises reacting a 3-hydroxyisoxazole derivative having the formula

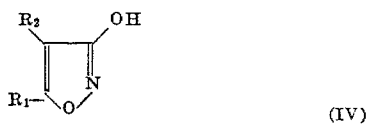

(IV)

wherein $R_1$ and $R_2$ are as defined above with an acid halide having the formula

(V)

wherein $X_1$ and $X_2$ are as defined above and X represents a halogen atom.

In carrying out the process as depicted above, the reaction may be advantageously effected in the presence of an inert organic solvent. Suitable examples of the solvent include aromatic hydrocarbons, e.g., benzene, toluene and xylene; aliphatic hydrocarbons, e.g.; petroleum ether and ligroin; cyclic ethers, e.g., dioxane and tetrahydrofuran halogenated hydrocarbons, e.g., chlorobenzene, carbon tetrachloride and dichloromethane; nitriles, e.g., acetonitrile; and the like.

The reaction in the process of this invention may also be effected in the presence of an inert organic solvent and an acid binding agent. Suitable examples of the acid binding agent include inorganic bases such as alkali metal hydroxides or carbonates, e.g., sodium hydroxide, potassium hydroxide, sodium carbonate and potassium carbonate; and organic bases such as tertiary amines, e.g., trimethylamine, triethylamine, pyridine and dimethylaniline.

In some cases, the reagent (V) may be employed in the reaction system for the purpose of both a reagent and a solvent.

The reaction temperature is not critical in this invention, but the reaction may be usually and advantageously effected at room temperature or below where the acid binding agent is employed and at a temperature ranging above 60° C., preferably about 80–130° C. where the acid binding agent is not utilized. However, an excessively high temperature should be avoided because of possible decomposition of the reactants.

The reaction period is also not critical, but the reaction is usually completed in about 30 minutes to about 5 hours.

After completion of the reaction, the desired product can be recovered and purified by a conventional means. For instance, the desired product, if separated in situ, can be recovered from the reaction mixture by filtration or, if not so precipitated, the desired product can be recovered from the reaction mixture by removing the solvent with distillation under reduced pressure. The crude product thus recovered may be, if desired, purified by a conventional means such as recrystallization from a suitable solvent.

In still another aspect of this invention, there is provided an agricultural bactericidal and fungicidal composition which comprises as an active ingredient the isoxazolinone Compound I and an agriculturally-acceptable carrier.

The active ingredient used in the composition according to this invention may be conveniently formulated by known procedures and used in various forms including water solubles, liquids, dusts, tablets, granules, emulsifiable concentrates and wettable powder etc.

Liquids may be prepared by dissolving the active ingredient in a suitable liquid agriculturally-acceptable carrier or solvent with or without one or more of numerous known adjuvants such as emulsifying agents, wetting agents, or dispersing agents. Suitable solvents include water, methanol, ethanol, acetone, benzene, toluene, xylenes, solvent naphtha, petroleum ether, the mixture thereof and the like. Suitable adjuvants may be any of those which is ordinarily employed in the art, and include, for example, the condensation products of alkylene oxides, with phenols or organic acids, alkylarylsulfonates, dialkyl sulfosuccinate, polyoxyethylene ether or ester derivatives of alcohols or acids and the like.

Dusts and granules may be prepared by mixing said active ingredient in and on an inert solid agriculturally-acceptable carrier by a conventional procedure. Suitable solid carriers for use in the composition of this invention include, for example, talc, pyrophylite, kieselguhr, clay, bentonite, diatomaceous earth, kaolin, precipitated chalk, radiolite and the like.

Wettable powders may be prepared by mixing the said active ingredients with one or more of the aforementioned solid carriers and suitable dispersing agents. Suitable dispersing agents include, for example, those aforementioned adjuvants such as alkylbenzenesulfonates, lignin sulfonates or polyoxyalkylene glycol ethers or esters.

Other forms, e.g., tablets, water solubles, emulsifiable concentrates and the like may also be prepared according to the well-known technique.

The concentration of the active ingredient in the composition of this invention may normally be from about 0.1 to about 95% by weight, and preferably from about 0.5 to about 50% by weight, based upon the total weight of the composition, for example, from about 0.5 to about 10% for a dust commonly employable; from about 5 to about 50% for a wettable powder commonly employable; from about 5 to about 30% for a liquid commonly employable and so on.

However, the amount of the active ingredient employed will largely depend upon such factors as the type and severity of diseases, the form of a composition or the specific active ingredient. It should be understood that the amount of an active ingredient employed be not critical feature of this invention. Two or more of said active ingredients may be conveniently incorporated into the agricultural bactericidal and fungicidal composition of this invention.

The agricultural bactericidal and fungicidal composition of this invention may also include other known bactericides and fungicides such as Kasugamycin, manganese ethylene-bisdithiocarbamate, 3-hydroxy-5-methylisoxazole and the like; insecticides such as 0,0-dimethyl-0-3-methyl-4-nitrophenyl phosphorothioate, O-ethyl-O-p-nitrophenyl phenylphosphonothioate, 2,2 - dichlorovinyl dimethyl phosphate and the like; acaricides such as fluoroacetamide, 2,4-dinitro-6-cyclohexyl-phenol and the like; and various fertilizers.

The composition according to this invention may be applied to diseased plants or those to be attached by any conventional way, for instance, by spraying onto a ground portion of a plant or stems and leaves or by pouring into soil or water, for instance, usually at a rate of about 1–500 g. of the active ingredient per 10 areas in the form of a dust, at a rate of about 3–5 l./m.² of a 0.005–1% diluted wettable powder.

The following examples are given solely for the purpose of illustrating some preferred embodiments of the preparation of the isoxazolinone compound of this invention.

EXAMPLE 1

2-chloroacetyl-5-methyl-3-isoxazolinone

In 30 ml. of dry toluene were dissolved 2.0 g. of 3-hydroxy-5-methylisoxazole and 2.3 g. of chloroacetyl chloride and the resulting solution was heated under reflux, whereupon vigorous evolution of gaseous HCl was observed. After the gas evolution ceased, the reaction mixture was cooled and the solvent was removed by distillation under reduced pressure. The residue was recrystallized from n-hexane to give 3.0 g. of the desired product as colorless crystals melting at 91–94° C.

Analysis for $C_6H_6ClNO_3$ (percent).—Calculated: C, 41.05; H, 3.45; Cl, 20.19; N, 7.98. Found: C, 41.00; H, 3.52; Cl, 20.05; N, 8.01.

EXAMPLE 2

2-bromoacetyl-4,5-dimethyl-3-isoxazolinone

The substantially same procedure as shown in the above Example 1 was repeated except that 2.3 g. of 3-hydroxy-4,5-dimethylisoxazole and 4.4 g. of bromoacetyl bromide were dissolved in 25 ml. of dry benzene to give 4.6 g. of the desired product as pale yellow oily substance boiling at 130–135° C./0.02 mm. Hg.

Analysis for $C_7H_8BrNO_3$ (percent): Calculated: C, 35.92; H, 3.45; Br, 34.14; N, 5.98. Found: C, 36.12; H, 3.65; Br, 33.91; N, 5.78.

EXAMPLE 3

2-chloroacetyl-4-chloro-5-methyl-3-isoxazolinone

Into a solution of 2.4 g. of 4-chloro-3-hydroxy-5-methylisoxazole and 2.0 g. of triethyl amine in 50 ml. of dry benzene was added dropwise with ice-cooling to a temperature below 15° C. a solution of 2.4 g. of chloroacetyl chloride in 10 ml. of dry benzene. After completion of the drop-wise addition, the resulting mixture was stirred at room temperature for 1 hour. Then, the salts precipitated in situ were removed by filtration and washed with some amounts of benzene. The combined filtrate and washings were treated with active charcoal and then the solvent was distilled off under reduced pressure.

The residue so obtained was recrystallized from a mixture of benzene and isopropyl ether (1:2) to give 3.0 g. of the desired product as colorless crystals melting at 63–65° C.

Analysis for $C_6H_5Cl_2NO_3$ (percent): Calculated: C, 34.31; H, 2.40; Cl, 33.76; N, 6.67. Found: C, 34.09; H, 2.45; Cl, 33.55; N, 6.49.

In order to illustrate potent bactericidal and fungicidal effects of the isoxazolinone compounds of this invention, some biological experiments and the results therefrom are shown as follows.

In the following examples, all parts are given by weight unless otherwise stated and the number of the test compound is the same as illustratively stated hereinabove.

EXAMPLE 4

Ten parts of the test compound indicated below was uniformly admixed with 85 parts of a mixture of clay and talc (1:1), 2 parts of polyvinyl alcohol and 3 parts of polyoxyethylene nonyl phenyl ether to form a wettable powder.

The wettable powder thus formed was diluted with water to the indicated concentration (300 p.p.m. and 1000 p.p.m.) and then applied by spraying to rice plant seedlings. The host plants were inoculated with spores of a pathogenic microorganism of rice blast (*Xanthomonas oryzae*) and kept at 27° C. and a relative humidity of 100%.

After 3 days from the inoculation, upper two leaves of the seedlings were visually examined to measure the number of diseased spots appearing thereon.

The results are summarized in the following Table 1.

[TABLE 1.—Preventive and curative effect against rice blast]

| No. of test compound: | No. of diseased spots per leaf | |
| --- | --- | --- |
| | 300 p.p.m. | 1,000 p.p.m. |
| 1 | 1.2 | 0 |
| 2 | 2.8 | 0 |
| 3 | 1.8 | 0 |
| 4 | 0.9 | 0 |
| 5 | 4.9 | 0 |
| 6 | 7.7 | 0 |
| 7 | 3.0 | 0 |
| Non-treated | | 31.6 |

EXAMPLE 5

Four parts of the test compound indicated below was uniformly admixed with 96 parts of a mixture of talc and clay (1:1) to form a dust.

The dust thus formed was applied by spraying at a rate of 3 kg./10 a. to rice plants which were at a panicle pregnancy period and being growing in a concrete frame (55 cm. x 55 cm.). Thereafter, a pathogenic microorganism of sheath blight (*Pellicularia sasaki*), which had been cultivated on oat grains for 10 days, was inoculated to the host plants at the portion near ground surface in their stems. After 7 days from the inoculation, a length of diseased spots developing from the inoculated portion was measured.

The results are summarized in the following Table 2.

TABLE 2

Preventive and curative effect against sheath blight

| No. of test compound: | Length of diseased spot (cm.) |
| --- | --- |
| 1 | 0.5 |
| 2 | 1.0 |
| 3 | 1.0 |
| 4 | 0.5 |
| 5 | 2.0 |
| 6 | 1.0 |
| 7 | 1.0 |
| Non-treated | 9.7 |

EXAMPLE 6

Into a mass of soil was uniformly admixed one of the pathogenic microorganisms, i.e., *Fusarium oxysporum* and *Rhizocotonia solani*.

Then, 200 cucumber seeds were sowed on each of the well admixed soil plots and then a 600 p.p.m. aqueous suspension of the wettable powder formulated as shown in the above Example 4 was sprayed thereover at a rate of 3 l./m.² After 2 weeks from the spraying, a number of diseased plants were investigated.

The results are summarized in the following Table 3.

TABLE 3

Preventive and creative effect against cucumber damping-off

| No. of test compound: | Diseased seedling percentage (percent) | |
| --- | --- | --- |
| | Fusarium | Rhizoctonia |
| 1 | 0 | 0 |
| 2 | 5.5 | 4.5 |
| 3 | 9.0 | 9.5 |
| 4 | 0 | 1.0 |
| 5 | 9.0 | 8.5 |
| 6 | 10.0 | 9.0 |
| 7 | 1.0 | 4.5 |
| Non-treated | 98.0 | 100.0 |

EXAMPLE 7

Each of 50 cucumber seedlings which were developing seed leaves were transplanted into soil and an appropriate amount of the suspension of spores of *Phytophthora*

*melonis* separatedly prepared was inoculated by spraying to the host plants at the near place of their roots. Thereafter, an aqueous suspension of the wettable powder formulated as shown in the above Example 4 and having the indicated concentration (600 p.p.m. and 200 p.p.m.), was sprayed thereover at a rate of 3 l./m.². The sprayed plants were kept under an over-saturation with moisture overnight and then stored in a green house. After 4 days from the spraying, a number of diseased plants were investigated.

The results are summarized in the following Table 4.

TABLE 4

| | Diseased seedling percentage (percent) | |
|---|---|---|
| | 600 p.p.m. | 200 p.p.m. |
| No. of test compound: | | |
| 1 | 0 | 0 |
| 2 | 0 | 30 |
| 3 | 10 | 30 |
| 4 | 0 | 0 |
| 5 | 10 | 40 |
| 6 | 20 | 30 |
| 7 | 0 | 20 |
| Non-treated | | 100 |

It can be clearly understood from the above-listed results that the isoxazolinone compounds of this invention exert potent bactericidal and fungicidal activties against various kinds of pathogenic and soil-borne diseases of crops without any degree of phytotoxicity.

What is claimed is:

1. A compound having the formula

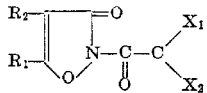

wherein $R_1$ represents lower alkyl having 1 to 5 carbon atoms or phenyl, $R_2$ represents a hydrogen atom, a halogen atom or lower alkyl having 1 to 5 carbon atoms, $X_1$ represents a halogen atom and $X_2$ represents a hydrogen atom or a halogen atom.

2. The compound according to claim 1 wherein $R_1$ represents alkyl of 1 to 3 carbon atoms or phenyl, $R_2$ represents a hydrogen atom, bromine atom, chlorine atom or alkyl of 1 to 3 carbon atoms, $X_1$ represents a bromine atom or chlorine atom and $X_2$ represents a hydrogen atom, bromine atom or chlorine atom.

3. The compound according to claim 1 wherein $R_1$ represents methyl or phenyl, $R_2$ represents a hydrogen atom, chlorine atom or methyl, $X_1$ represents a bromine atom or chlorine atom and $X_2$ represents a hydrogen atom or chlorine atom.

4. 2-bromoacetyl-5-methyl-3-isoxazolinone.
5. 2-dichloroacetyl-5-methyl-3-isoxazolinone.
6. 2-bromoacetyl-4,5-dimethyl-3-isoxazolinone.
7. 2-chloroacetyl-5-methyl-3-isoxazolinone.
8. 2-chloroacetyl-5-phenyl-3-isoxazolinone.
9. 2-chloroacetyl-4-chloro-5-phenyl-3-isoxazolinone.
10. 2-chloroacetyl-4-chloro-5-methyl-3-isoxazolinone.

References Cited

Wagner et al., "Synthetic Organic Chemistry," Wiley Press, New York (1953), p. 576.

Wiley, "Chemistry of Heterocyclic Compounds," vol. 17, Interscience Publ., 1962, p. 151.

ALEX MAZEL, Primary Examiner

R. V. RUSH, Assistant Examiner

U.S. Cl. X.R.

424—272